(12) United States Patent
Li et al.

(10) Patent No.: US 12,412,389 B2
(45) Date of Patent: Sep. 9, 2025

(54) METHOD AND SYSTEM FOR MULTI-SOURCE ALGAE IMAGE TARGET DETECTION

(71) Applicant: Macau University of Science and Technology, Macau (CN)

(72) Inventors: Jianqing Li, Macau (CN); Anran Yuan, Macau (CN); Binbin Wang, Macau (CN); Hailin Zou, Macau (CN); Jierui Wang, Macau (CN)

(73) Assignee: Macau University of Science and Technology

( * ) Notice: Subject to any disclaimer, the term of this patent is extended or adjusted under 35 U.S.C. 154(b) by 437 days.

(21) Appl. No.: 18/063,781

(22) Filed: Dec. 9, 2022

(65) Prior Publication Data

US 2024/0087310 A1     Mar. 14, 2024

(30) Foreign Application Priority Data

Sep. 2, 2022   (CN) .......................... 202211068927.X

(51) Int. Cl.
*G06V 20/10*     (2022.01)
*G06F 16/51*     (2019.01)
(Continued)

(52) U.S. Cl.
CPC ............ *G06V 20/188* (2022.01); *G06F 16/51* (2019.01); *G06V 10/764* (2022.01);
(Continued)

(58) Field of Classification Search
CPC .. G06V 20/188; G06V 10/764; G06V 10/774; G06V 10/82; G06V 2201/07;
(Continued)

(56) References Cited

FOREIGN PATENT DOCUMENTS

| CN | 108897778 A | * | 11/2018 | ........... G06K 9/6215 |
| CN | 112784748 A | * | 5/2021 | |

OTHER PUBLICATIONS

Samantaray A, Yang B, Dietz JE, Min BC. Algae detection using computer vision and deep learning. arXiv preprint arXiv: 1811. 10847. Nov. 27, 2018. (Year: 2018).*

(Continued)

*Primary Examiner* — Wassim Mahrouka
(74) *Attorney, Agent, or Firm* — Lambert Shortell & Connaughton; David J. Connaughton, Jr.; Justin P. Tinger

(57) ABSTRACT

The present disclosure relates to a method and system for multi-source algae image target detection, and relates to the field of monitoring of algal bloom events in fresh water. The method includes first crawling images of algae of a selected species by using a built automated algae crawling tool, where the images include all formats; classifying and labeling algae in the algae images, and forming a source domain dataset by using all the classified and labeled algae images; performing transfer learning by using a faster recurrent revolutional neural network (Faster RCNN) with reference to a target domain dataset, to obtain a multi-source algae image target detection model; and finally performing identification and classification by using the multi-source algae image target detection model.

4 Claims, 2 Drawing Sheets

(51) Int. Cl.
   *G06V 10/764* (2022.01)
   *G06V 10/774* (2022.01)
   *G06V 10/82* (2022.01)

(52) U.S. Cl.
   CPC ............ *G06V 10/774* (2022.01); *G06V 10/82* (2022.01); *G06V 2201/07* (2022.01)

(58) Field of Classification Search
   CPC .... G06V 20/693; G06V 20/698; G06V 20/69; G06F 16/51; G06F 16/951; G06F 16/955; G06N 3/08; G06N 3/082; G06N 3/088
   See application file for complete search history.

(56) References Cited

OTHER PUBLICATIONS

Machine English translation of CN-108897778 by Hua (Year: 2018).*

Machine English translation of CN-112784748 by Wang (Year: 2021).*

* cited by examiner

METHOD AND SYSTEM FOR MULTI-SOURCE ALGAE IMAGE TARGET DETECTION

CROSS REFERENCE TO RELATED APPLICATION

This patent application claims the benefit and priority of Chinese Patent Application No. 202211068927.X filed with the China National Intellectual Property Administration on Sep. 2, 2022, the disclosure of which is incorporated by reference herein in its entirety as part of the present application.

TECHNICAL FIELD

The present disclosure relates to the field of monitoring of algal bloom events in fresh water, and in particular, to a method and system for multi-source algae image target detection.

BACKGROUND

With the rapid development of industry and agriculture, environmental pollution worsens. In particular, eutrophication has occurred frequently, which led to the sudden and excessive proliferation of algae, commonly known as algal blooms. Eutrophication is a phenomenon caused by the massive proliferation of phytoplankton in water. Because of the frequent HABs, fresh water is subjected to secondary pollution, and its water quality is seriously damaged. Harmful Algal Bloom (HAB) causes many negative impacts, such as oxygen depletion, and fish-containing toxins.

Some algae produce toxins that affect health sectors. Species that cause blooms tend to be different in different bodies of water. Usually, the algae that cause the blooms include Cyanobacteria, Diatoms, Golden algae, Green algae, and Dinoflagellates. Which are quite different in morphology, physiology, and ecology. Therefore, it is necessary to identify the species causing HAB precisely.

Solution: Harmful Species Detection
Prior Art in this Field: Machine Learning-Based Algae Image Classification (1) In algal bloom monitoring, data source mainly from the microscope, Imaging FlowCytobot (IFCB), and Flowcam flow cytometry photographing system. Formats of algae images from different data sources are incompatible. Currently, algae image classification methods based on machine learning are used to process and analyze images from only a single data source.

(2) Machine learning (ML) and deep learning techniques were used in algae image classification, such as twelve microalgae classification found in an aquatic ecosystem of Thailand by Promdaen et al., a machine learning model based on a feature combination method and a sequential minimal optimization (SMO) technology was used to achieve the accuracy of 97.22%. Deglint et al. used a pre-trained deep residual convolutional neural network technique to classify six algal taxa, achieving the accuracy of 96%. Park et al. used a convolutional neural network (CNN) model to classify eight algal taxa in a watershed and obtained an F1 score of 0.95. In the Gulf of Mexico, Balakrishna Gokaraju et al. proposed a method for detecting algal bloom events through Spatio-temporal data mining based on machine learning. In Hong Kong, Jiuhao Guo, Joseph H. W. Lee, Ken T. M. Won et al. used water quality data of subtropical coastal waters around Hong Kong measured by IFCB sensors to propose a system for daily algal bloom risk prediction based on a data-driven artificial neural network (ANN).

Shortcomings Existing in the Prior Art (1) Algae classification model needs to be improved.

The method for algae image detection based on machine learning and deep neural networks needs a lot of labeled image data. Some species of harmful algae are difficult to distinguish. Facing real-world datasets covering many species of algae, the classifier needs to be improved. And algal taxonomists cannot handle massive real-world data. In addition, current classification methods are based on big data, which are restricted in applications.

More importantly, sampling workers collect the latest water samples and observe the algae through the microscope. Usually, the algae images in the microscope contain several algae. However, algae classification models only address an image containing one alga, not multiple.

(2) Different algae species in different regions make the well-trained model difficult to generalize and transfer.

Currently, there is no general algal database. And related algae database is lacking in terms of ample size, image quality, and species information, which makes it difficult to perform the algae classification model.

(3) A current algae classification model has poor generalization, and different sampling devices lead to poor classification performance.

Algae images captured by IFCB and microscopes are quite different from those of algae images in a database, resulting in poor classification performance. Currently, an algae classifier that can be compatible with algae images collected by various devices has not been reported. For example, a dataset of 16,000 images of 8 different species of algae was used by Gaur A et al. The dataset came from various open-access algae image libraries. Ghatkar used remote sensing data measured by sensors and spectral information of algal blooms to classify harmful algae forming the algal blooms, instead of algae images. Even though some algae classifiers show a good classification performance on high-quality datasets, they are incompatible with datasets in other formats.

SUMMARY

An objective of the present disclosure is to provide a method and system for high-precision multi-source algae image target detection.

The present disclosure provides the following technical solutions:

A method for multi-source algae image target detection includes:
building automated algae crawling tool;
crawling multi-source algae images by the automated algae crawling tool based on an Algae index;
framing a bounding box of algae in an algae image by the YOLO v3 target detection algorithm, and assigning the corresponding label, to form a source domain dataset;
obtaining a target domain dataset composed of unlabeled algal images;
performing transfer learning by using a Faster Recurrent Convolutional Neural Network (Faster RCNN) based on the source domain dataset and the target domain dataset, to obtain a multi-source algae image target detection model;
inputting a to-be-detected algae image into the multi-source algae image target detection model, and outputting a detection result.

Optionally, the automated algae crawling tool includes a uniform resource locator (URL) manager, a scheduler, a web page downloader, and a web page parser;

the scheduler is used to obtain a to-be-crawled URL address from the URL manager, and transmit the to-be-crawled URL address to the web page downloader;

the web page downloader is used to download a web page based on the to-be-crawled URL address, convert the web page into a web page string, and then transmit the web page string to the web page parser by using the scheduler;

the web page parser is used to parse the web page string, obtain download addresses of algae images by regular expression, and crawl algae images from open-source Chinese and English websites in a semi-automatic manner based on the download addresses; and the scheduler is used to receive the crawled algae images.

Optionally, after crawling multi-source algae images, the source domain datasets construction further includes the following:

inputting all the algae images into a pre-trained binary classifier to determine whether the image is algae, and obtaining a first output result;

deleting the algae image if the first output result indicates that the image is not alga;

retaining, if the first output result indicates that the image is algae, the clarity greater than the clarity threshold, and a proportion of algae in the image greater than the threshold;

determining, by using a target detection algorithm, whether foreign substance exists in the retained algae image, and obtaining a second output result;

retaining the algae image if the second output result indicates that the image is not alga deleting, if the second output result indicates that the image is algae, algae images whose foreign substance is determined, by using an ablation experiment, as interfering with subsequent network learning;

selecting a preset quantity of algae images from the retained algae images, and performing data enhancement on the retained algae images through cropping, rotation, and scaling.

Optionally, the performing transfer learning by using a Faster RCNN specifically includes:

freezing the initial setting convolutional layers and pooling layers of a Backbone module in the Faster RCNN, and extracting a feature map by using the Backbone module;

adjusting network parameters based on a difference between the source domain dataset and the target domain dataset; and using a multi-kernel maximum mean discrepancy (MK-MMD) in a deep adaptation network to adapt to multiple fully-connected network layers in the Faster RCNN, to reduce a difference between a source domain and a target domain by using the MK-MMD.

Optionally, the to-be-detected algae image is an algae image in which algae are observed under an optical microscope.

A system for multi-source algae image target detection includes:

a building module configured to build automated algae crawling tool;

a crawling module configured to crawl multi-source algae images by using the automated algae crawling tool based on an algae name index;

a classification and labeling module configured to frame a bounding box of algae in an algae image by using a target detection algorithm of the YOLO v3 model, and assign a label of a crawler index, to form a source domain dataset;

a target domain dataset acquisition module configured to obtain a target domain dataset composed of unlabeled algal images;

a transfer learning module configured to perform transfer learning by using a Faster RCNN based on the source domain dataset and the target domain dataset, to obtain a multi-source algae image target detection model; and a classification detection module configured to input a to-be-detected algae image into the multi-source algae image target detection model, and output classification results of each alga in the algal image.

According to the specific embodiments provided by the present disclosure, the present disclosure discloses the following technical effects:

The present disclosure discloses a method and system for multi-source algae image target detection. The method includes first crawling images of algae of a selected species by an automated algae crawling tool, where the images are from multi-sources; classifying and labeling algae in the algae images, and forming a source domain dataset by using all the classified and labeled algae images; performing transfer learning by using a Faster RCNN with reference to a target domain dataset, to obtain a multi-source algae image target detection model; and finally performing identification and classification by using the multi-source algae image target detection model. In the present disclosure, based on a current algae dataset with a small number of labeled samples, the universal target detection model that can identify multiple species of algae is trained, can detect algae images of multiple formats, and can implement high-precision multi-source algae detection.

BRIEF DESCRIPTION OF THE DRAWINGS

To describe technical solutions in the embodiments of the present disclosure or in the prior art more clearly, the accompanying drawings required in the embodiments are briefly described below. Obviously, the accompanying drawings described below show only some embodiments of the present disclosure. A person of ordinary skill in the art may further obtain other accompanying drawings based on these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method and system for high-precision multi-source algae detection.

Next, the present disclosure will be further described in detail below with reference to the accompanying drawings and specific implementations.

Figure 1:
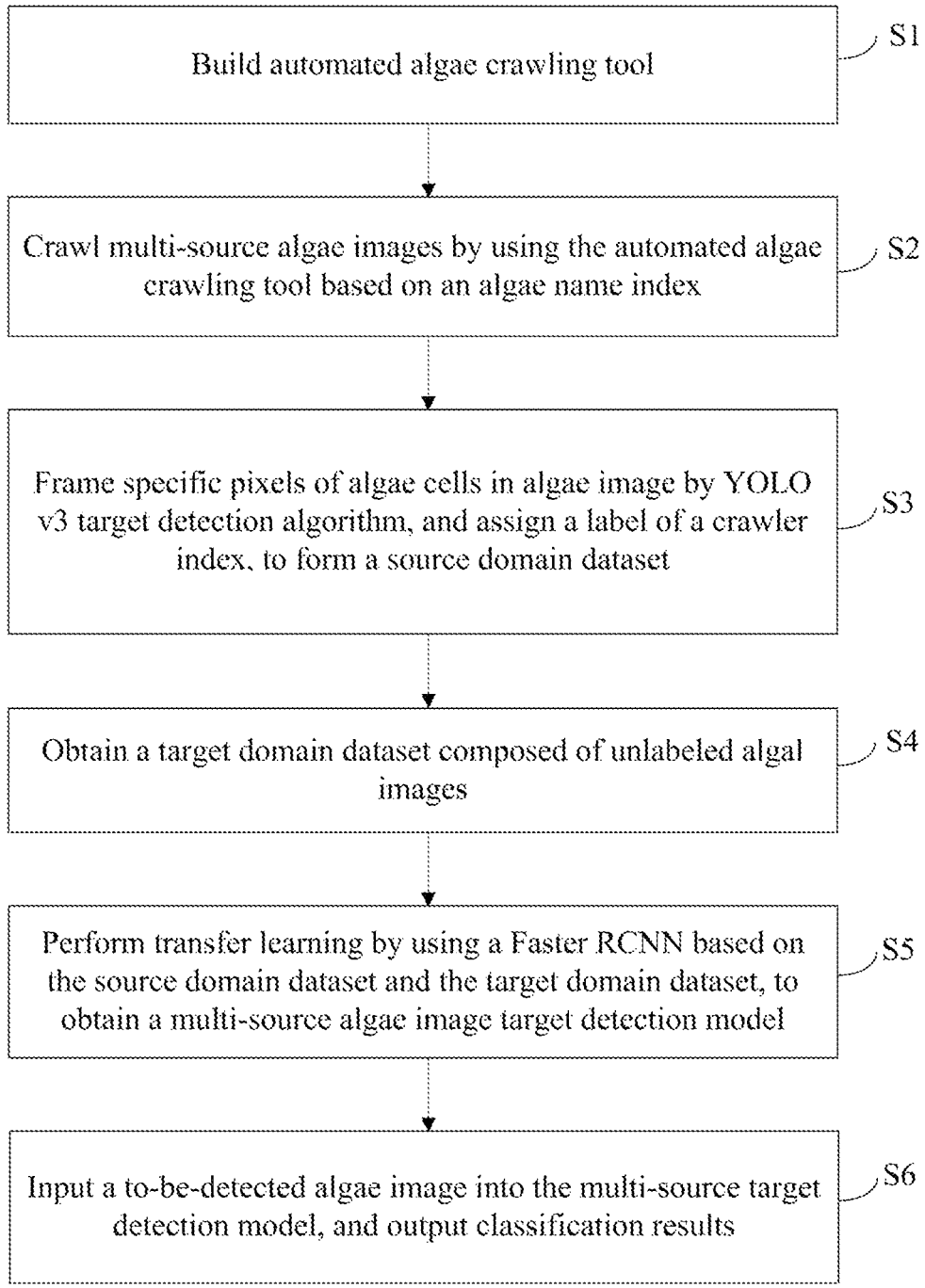
FIG. 1 is a flowchart of a method for multi-source algae image target detection according to an embodiment of the present disclosure.

An embodiment of the present disclosure provides a method for multi-source algae detection, as shown in FIG. 1, including the following steps.

Step S1: Build automated algae crawling tool.

Figure 2:
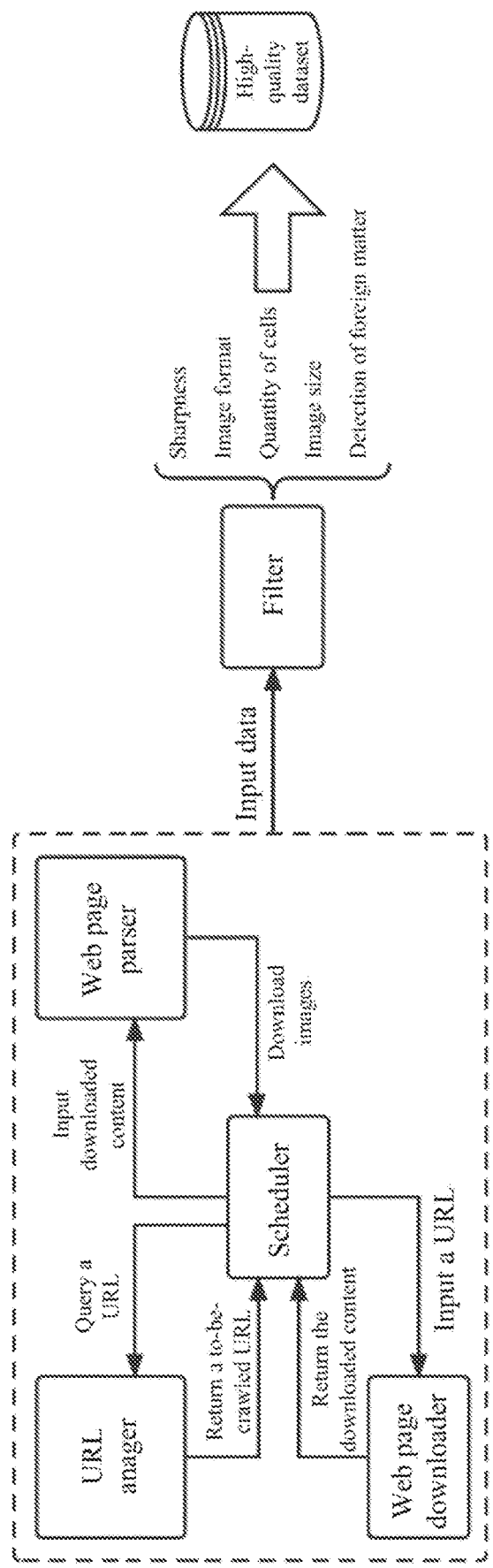
FIG. 2 is a diagram of an algorithm principle of an automated algae crawling tool according to an embodiment of the present disclosure.

FIG. 2 is a diagram of an algorithm principle of the automated algae crawling tool. The left half part of FIG. 2 shows a crawler framework, which is mainly composed of four parts: a URL manager, a scheduler, a web page downloader, and a web page parser. The scheduler is mainly responsible for scheduling coordination operations among the URL manager, the web page downloader, and the web page parser.

In the present disclosure, the automated algae crawling tool is built to crawl relevant algae images on the network, to expand an algae database suitable for the target body of water.

The algae crawling tool automatically performs, which provides diverse sample sand a transferable model.

Step S2: Crawl multi-source algae images by using the automated algae crawling tool based on an algae name index.

Based on a list of common algae in target waters provided by biologists, algae images (generally captured by multiple sampling instruments and devices including an IFCB, Flow-Cam, optical microscope, etc.) are crawled from the network by the automated algae crawling tool.

Taking freshwater algae as a research object, and taking the crawling of *Chroococcus* (Chloroccum), a common species in freshwater in Macao, as an example, the crawling process is as follows.

1. The scheduler first obtains a to-be-crawled URL address from the URL manager, and transmits the to-be-crawled URL address to the downloader.

2. Searching for *Chroococcus* (Chloroccum) is simulated to obtain a URL address of a search result. The downloader downloads the web page by using the URL address and converts the web page into a string.

3. The parser parses the web page string, analyzes a position of an image download address in the string, and obtains download addresses of *Chroococcus* images by regular expression.

4. A parsing method generally includes a regular expression, HTML. Parser and Beautiful Soup.

5. Algae images are crawled from open-source websites (Baidu Baike, Wikipedia, algae database websites, and other websites) in a semi-automated manner.

Step S3: Frame a bounding box of algae in the image by YOLO v3 target detection algorithm, and assign a label of a crawler index, to form a source domain dataset.

Referring to FIG. 2, crawled algae images are transmitted into a filter, and filtering rules are as follows.

1. Based on features of collected algae images, such as clarity, color, style, the size of algae, and whether a foreign substance exists, each image is input into a pre-trained binary classifier to determine whether the image is algae, and then filtering is performed.

2. Images with high sharpness and with a large proportion of algae are retained.

3. Whether foreign substance exists and whether the foreign substance blocks exist are determined by a target detection algorithm, and whether the foreign substance interferes with subsequent network learning can be subsequently determined by an ablation experiment.

4. 50 high-quality images of *Chroococcus* (Chloroccum) algae are selected based on the foregoing several rules as a dataset for transfer learning.

5. Data enhancement operations, such as cropping, rotation, and scaling, are performed on the 50 crawled algae images. And the crawled algae images are as input for the target detection algorithm.

The YOLOv3 model is used to select target algae images for dataset expansion. The obtained data is defined as source domain data.

Further, source domain data are checked with manual assistance.

Step S4: Obtain a target domain dataset composed of unlabeled algal images.

Target domain data are algae images that are obtained by on-site sampling and that are not identified by biological taxonomists (usually obtained by a single device, the optical microscope). And the target domain data is unlabeled.

Step S5: Perform transfer learning by using a Faster RCNN based on the source domain dataset and the target domain dataset, to obtain a multi-source algae image target detection model.

The Faster RCNN is used as a base network. The Faster RCNN is composed of convolutional layers, a region proposal network (RPN), region of interest (ROI) pooling layers, and a classifier. As a CNN-based target detection algorithm, the Faster RCNN first uses a basic set of convolutions, activation functions, and pooling layers to extract feature maps. And the RPN determines whether an anchor is a positive value or a negative value, and then uses regression to correct the anchor point to obtain accurate target frames. The ROI pooling layer collects the input feature map and ROIs, synthesizes the information, and then sends the information to the subsequent fully connected layer for determining a target class. Finally, the target frames are classified and regressed again to obtain an accurate position.

As deep features will eventually transition from general to specific, the initial several convolutional layers and pooling layers of a Backbone module in the Faster RCNN algorithm are mainly responsible for receiving input data, performing data preprocessing and feature extraction to obtain feature maps corresponding to input images, and then transferring the feature maps to the next layer. The features extracted in this part are relatively universal, the parameters of these layers are frozen during feature extraction of the source domain and the target domain.

The intermediate layer of the Backbone module in the Faster RCNN is less transferable, and a difference between the source domain and the target domain is learned by fine-tuning network parameters.

An MK-MMD in a deep adaptation network (DAN) is used to adapt to multiple fully-connected network layers of an RCNN network module in the Faster RCNN.

Input features of the ROIs are classified and regressed to obtain a position and a label of a predicted target, and losses of the RCNN are calculated, to update the network parameters.

The MMD is calculated to reduce the difference between the source domain and the target domain. The MK-MMD algorithm reduces the difference between data domains of images captured by a microscope and a cell flow cytometer and enhances feature migration of a specific task layer of a deep learning neural network.

Step S6: Input a to-be-detected algae image into the multi-source target detection model, and output classification results.

After a transfer learning network is trained, an experimenter obtains the latest algae image as input to obtain predicted algae.

In the present disclosure, based on a current algae dataset with a small number of labeled samples, the data crawling technique and transfer learning technique are used to train a target detection model that can identify multi-source freshwater algae. And the corresponding freshwater algae image dataset is built, to implement high-precision freshwater algae identification, and be applicable to the training and analysis of non-selected algae.

(1) Method for Expanding a Labeled Algae Dataset Based on a Web Crawler

For data obtained by an automated crawling tool, a universal water standard that can be compatible with different water is established. For example, collected algae images may have different formats, scales, and sizes, or even from different devices. The data is filtered using this universal standard, to improve algae data quality, and unify sizes, pixels, etc. of the algae data.

After the body of water is replaced, a common algae classification system has poor classification performance due to changes in algae species. Therefore, in most cases, the classification o can only be performed manually. For example, algorithms that perform well in the United States West Coast waters may not perform well in subtropical waters. And manual identification is costly and inefficient. Therefore, establishing a unique algae database resolves the problems of low efficiency, lack of human resources, fewer biological identification experts, fewer algae image samples, high costs of algae image capture devices (2) A Transferable Model from a Network Algae Database to a Target Algae Database is Established.

Generalization in deep learning models needs improvement, that is, the training is effective in a certain field and a certain dataset, and it is difficult to transfer the result to another scenario. And transfer learning is to transfer information "learned" from the source domain data domain to the target domain. Specifically, crawled data is defined as unlabeled data, target data is defined as labeled data, definitions of loss functions and training modes of an unsupervised model and a supervised model are provided, and a method of knowledge distillation in a transfer process is provided.

In the present disclosure, algae information after target water body replacement can be automatically learned. A conventional classification system has a high requirement on the data volume, but a classification system of the present disclosure requires a data volume contrary to a large data sample volume, and researchers only need to observe algae sample information under a microscope, so that a better target detection performance can be evaluated. The detection system can learn universal algae learning ability, and can be compatible with algae images of multiple formats, including images obtained by a flow cytometer, images obtained by a microscope, algae images obtained by a micro-photographing system in a mobile phone, etc.

Corresponding to the foregoing method for multi-source algae image target detection, an embodiment of the present disclosure further provides a system for multi-source algae image target detection, including:

a building module configured to build automated algae crawling tool;

a crawling module configured to crawl multi-source algae images by using the automated algae crawling tool based on an algae name index;

a classification and labeling module configured to frame a bounding box of algae in each algae image by using a target detection algorithm of a YOLOv3 model, and assign a label of a crawler index, to form a source domain dataset;

a target domain dataset acquisition module configured to obtain a target domain dataset composed of unlabeled algal images;

a transfer learning module configured to perform transfer learning by using a Faster RCNN based on the source domain dataset and the target domain dataset, to obtain a multi-source algae image target detection model; and a classification detection module configured to input a to-be-detected algae image into the multi-source algae image target detection model, and output classification results of each alga in the algal image.

The system for target detection of a multi-source algae image according to this embodiment of the present disclosure is similar to the method for target detection of a multi-source algae image in operating principles and beneficial effects, and thus details are not described herein again. For details, reference may be made to the description of the foregoing method embodiment.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of this specification shall not be construed as limitation to the present disclosure.

What is claimed is:

1. A method for multi-source algae image target detection, comprising:

building an automated algae crawling tool;

crawling multi-source algae images by the automated algae crawling tool based on algae name index;

wherein after the crawling multi-source algae images by using the automated algae crawling tool based on an algae name index, the method further comprises:

inputting all the algae images into a pre-trained binary classifier to determine whether the algae image is algae, and obtaining a first output result;

deleting the algae image if the first output result indicates that the image is not alga; or retaining, if the first output result indicates that the image is algae, the clarity greater than the clarity threshold and a proportion of algae in the image greater than the threshold;

determining, by using a target detection algorithm, whether a foreign substance exists in the retained algae image, and obtaining a second output result;

retaining the algae image if the second output result indicates that the image is not alga; or deleting, if the second output result indicates that the image is algae, algae images whose foreign substance is determined, by using an ablation experiment, as interfering with subsequent network learning; and selecting a preset quantity of algae images from the retained algae images, and performing data enhancement on the retained algae images through cropping, rotation, and scaling;

framing a bounding box of algae in an algae image by YOLO v3 target detection algorithm, and assigning a label of a crawler index, to form a source domain dataset;

obtaining a target domain dataset composed of unlabeled algal images;

performing transfer learning by using a Faster Recurrent Convolutional Neural Network based on the source domain dataset and the target domain dataset, to obtain a multi-source algae image target detection model;

inputting a to-be-detected algae image into the multi-source algae image target detection model, and outputting a pixel-level classification result.

2. The method for multi-source algae image target detection according to claim 1, wherein the automated algae crawling tool comprises a uniform resource locator (URL) manager, a scheduler, a web page downloader, and a web page parser;

the scheduler is used to obtain a to-be-crawled URL address from the URL manager, and transmit the to-be-crawled URL address to the web page downloader;

the web page downloader is used to download a web page based on the to-be-crawled URL address, convert the web page into a web page string, and then transmit the web page string to the web page parser by using the scheduler;

the web page parser is used to parse the web page string, obtain download addresses of algae images by regular expression, and crawl algae images from open-source Chinese and English websites in a semi-automatic manner based on the download addresses; and the scheduler is further used to receive the crawled algae images.

3. The method for multi-source algae image target detection according to claim 1, wherein the performing transfer learning by using a Faster RCNN specifically comprises:

freezing the initial setting convolutional layers and pooling layers of a Backbone module in the Faster RCNN, and extracting a feature map by using the Backbone module;

adjusting network parameters based on a difference between the source domain dataset and the target domain dataset; and using a multi-kernel maximum mean discrepancy (MK-MMD) in a deep adaptation network to adapt to multiple fully-connected network layers of an RCNN network module in the Faster RCNN, to reduce a difference between a source domain and a target domain by using the MK-MMD.

4. The method for multi-source algae image target detection according to claim 1, wherein the to-be-detected algae image is an algae image in which algae are observed under an optical microscope.

* * * * *